US011928911B2

(12) United States Patent
Quartarone et al.

(10) Patent No.: US 11,928,911 B2
(45) Date of Patent: Mar. 12, 2024

(54) SYSTEMS AND METHODS FOR DISPENSING PRODUCTS SELECTED AT REMOTE POINT-OF-SALE DEVICES

(75) Inventors: Daniel S. Quartarone, Stone Mountain, GA (US); Arthur G. Rudick, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 578 days.

(21) Appl. No.: 13/567,118

(22) Filed: Aug. 6, 2012

(65) Prior Publication Data

US 2014/0040055 A1 Feb. 6, 2014

(51) Int. Cl.
*G07F 13/06* (2006.01)

(52) U.S. Cl.
CPC .................................... *G07F 13/06* (2013.01)

(58) Field of Classification Search
CPC ........ G06Q 30/06; G06Q 30/02; G06Q 20/20; G06Q 20/202; G06Q 20/40; G06Q 20/3278; G07F 13/06
USPC ........................................................... 705/21
See application file for complete search history.

(56) References Cited

U.S. PATENT DOCUMENTS 4,237,536 A 12/1980 Enelow et al.
5,074,341 A * 12/1991 Credle, Jr. ................ G07F 5/18 141/1
5,363,671 A 11/1994 Forsythe et al.
5,445,290 A 8/1995 Forsythe et al.
5,664,110 A 9/1997 Green et al.
6,053,359 A 4/2000 Goulet et al.
6,102,246 A 8/2000 Goulet et al.
6,135,169 A 10/2000 Sandei et al.
6,439,345 B1 8/2002 Recktenwald et al.
6,473,739 B1 10/2002 Showghi et al.
7,110,964 B2 9/2006 Tengler et al.
7,757,896 B2 7/2010 Carpenter et al.
2001/0038462 A1 11/2001 Teeuwen et al.
2004/0054592 A1* 3/2004 Hernblad
2006/0218039 A1 9/2006 Johnson
2007/0088620 A1 4/2007 Tengler et al.
(Continued)

FOREIGN PATENT DOCUMENTS

AU 2010100405 A4 10/2010
GB 2 451 508 A 2/2009
(Continued)

OTHER PUBLICATIONS

Energy Conservation Program: Energy Conservation Standards for Refrigerated Bottled or Canned Beverage Vending Machines the Federal Register / FIND; Washington, vol. 73, Iss. 116, (Jun. 16, 2008). (Year: 2008).*

*Primary Examiner* — Florian M Zeender
*Assistant Examiner* — Fawaad Haider
(74) *Attorney, Agent, or Firm* — Eversheds Sutherland (US) LLP

(57) ABSTRACT

The present application provides a remote beverage dispensing system for filling a number of orders with one or more beverage selections. The remote beverage dispensing system may include a point-of-sale device for receiving the orders and a remote beverage dispenser for filling the orders. The remote beverage dispenser may include a point-of-sale order queue and a manual selection screen. The point-of-sale order queue may include the beverages selections in each of the number of orders.

23 Claims, 9 Drawing Sheets

(56) References Cited

U.S. PATENT DOCUMENTS

| | | | | |
|---|---|---|---|---|
| 2007/0088624 | A1 | 4/2007 | Vaugh et al. | |
| 2007/0205221 | A1 | 9/2007 | Carpenter et al. | |
| 2007/0235533 | A1 | 10/2007 | Giordano | |
| 2007/0265935 | A1 | 11/2007 | Woycik et al. | |
| 2008/0142115 | A1* | 6/2008 | Vogt | B67D 1/0007 141/374 |
| 2008/0276641 | A1 | 11/2008 | Wolski et al. | |
| 2008/0313046 | A1* | 12/2008 | Denenburg | G06Q 20/20 705/15 |
| 2009/0069933 | A1 | 3/2009 | Rudick et al. | |
| 2009/0070234 | A1 | 3/2009 | Peters et al. | |
| 2009/0101233 | A1* | 4/2009 | Owens | B67D 1/0041 141/369 |
| 2009/0160735 | A1* | 6/2009 | Mack | G06Q 30/02 345/2.3 |
| 2009/0259555 | A1 | 10/2009 | Carroll et al. | |
| 2010/0198643 | A1 | 8/2010 | Friedman et al. | |
| 2010/0268378 | A1* | 10/2010 | Sharpley | G06Q 30/0603 700/236 |
| 2011/0163126 | A1 | 7/2011 | Carpenter et al. | |
| 2011/0168755 | A1 | 7/2011 | Zetten | |
| 2011/0264285 | A1* | 10/2011 | Mattos, Jr. | B67D 1/0888 700/283 |
| 2012/0156337 | A1* | 6/2012 | Studor | A47J 31/521 426/231 |
| 2012/0160871 | A1 | 6/2012 | Carpenter et al. | |
| 2012/0285989 | A1 | 11/2012 | Rudick et al. | |
| 2013/0087050 | A1* | 4/2013 | Studor | A47J 31/52 99/285 |
| 2013/0124355 | A1* | 5/2013 | Wazihullah | G06Q 30/0605 705/26.2 |
| 2013/0226651 | A1* | 8/2013 | Napper | |
| 2013/0248560 | A1 | 9/2013 | Carpenter et al. | |

FOREIGN PATENT DOCUMENTS

| | | |
|---|---|---|
| WO | 2009/032877 A2 | 3/2009 |
| WO | 2009/032941 A2 | 3/2009 |

* cited by examiner

SYSTEMS AND METHODS FOR DISPENSING PRODUCTS SELECTED AT REMOTE POINT-OF-SALE DEVICES

TECHNICAL FIELD

The present application and the resultant patent relate generally to systems and methods for dispensing products and more particularly relate to systems and methods for dispensing products such as beverages and the like selected at remote point-of-sale devices.

BACKGROUND OF THE INVENTION

Beverage dispensers traditionally combine a diluent such as water with a beverage base such as a syrup and the like. These beverage bases generally have a dilution or a reconstitution ratio of about three to one (3:1) to about six to one (6:1). The beverage bases usually come in large bag-in-box containers that require significant amounts of storage space and may need to be refrigerated. These storage requirements often necessitate the need to position these bag-in-box containers away from the dispenser in a backroom with a long supply line. Each bag-in-box container usually only holds a beverage base for a single type or flavor of beverage such that multiple bag-in-box containers may be required to provide the consumer with a variety of beverage options.

Resent improvements in beverage dispensing technology have focused on the use of micro-ingredients. With micro-ingredients, the traditional beverage bases may be separated into their constituent parts at much higher reconstitution ratios. These micro-ingredients then may be stored in much smaller packages and stored closer to, adjacent to, or within the beverage dispenser itself. The beverage dispenser preferably may provide the consumer with multiple beverage options as well as the ability to customize his or her beverage as desired.

Beverage dispensers incorporating such highly concentrated micro-ingredients have proven to be popular with consumers. One example of the use of such micro-ingredients is shown in commonly owned U.S. Pat. No. 7,757,896 B2 to Carpenter, et al., entitled “BEVERAGE DISPENSING SYSTEM.” U.S. Pat. No. 7,757,896 B2 is incorporated herein by reference herein in full. Likewise, such micro-ingredient technology is incorporated in the popular “FREESTYLE®” refrigerated beverage dispensing units provided by The Coca-Cola Company of Atlanta, Georgia The “FREESTYLE®” refrigerated beverage dispensing units can dispense over 125 flavors or brands without the need for extensive storage space.

There is now a desire to incorporate such micro-ingredient technology into behind the counter or crew serve applications in venues such as full service restaurants, quick service restaurants, drive throughs, and the like. The use of such micro-ingredient technology may allow the venue to offer dozens of different beverages without significant storage requirements in a fast and efficient manner.

SUMMARY OF THE INVENTION

The present application and the resultant patent thus provide a remote beverage dispensing system for filling a number of orders with one or more beverage selections. The remote beverage dispensing system may include a point-of-sale device for receiving the orders and a remote beverage dispenser for filling the orders. The remote beverage dispenser may include a point-of-sale order queue and a manual selection screen. The point-of-sale order queue may include the beverages selections in each of the number of orders.

The present application and the resultant patent further provide a method of remotely filling one or more beverage selections in a number of orders. The method may include the steps of receiving the orders at a point-of-sale device, displaying the beverage selections in each order at a remote beverage dispenser, accepting pour instructions for any beverage selection in any order, indicating when an order is fulfilled, and accepting additional beverage selections at the remote beverage dispenser.

The present application and the resultant patent further provide a remote beverage dispensing system for filling a number of orders with one or more beverage selections. The remote beverage dispensing system may include a number of point-of-sale devices for receiving the orders and one or more remote beverage dispensers for filling the orders. The point-of-sale devices and the remote beverage dispensers may include two way communication therebetween such that the point-of-sale devices deliver the orders to be filled by the remote beverage dispensers and the remote beverage dispensers inform the point-of-sale devices if a beverage selection is unavailable.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
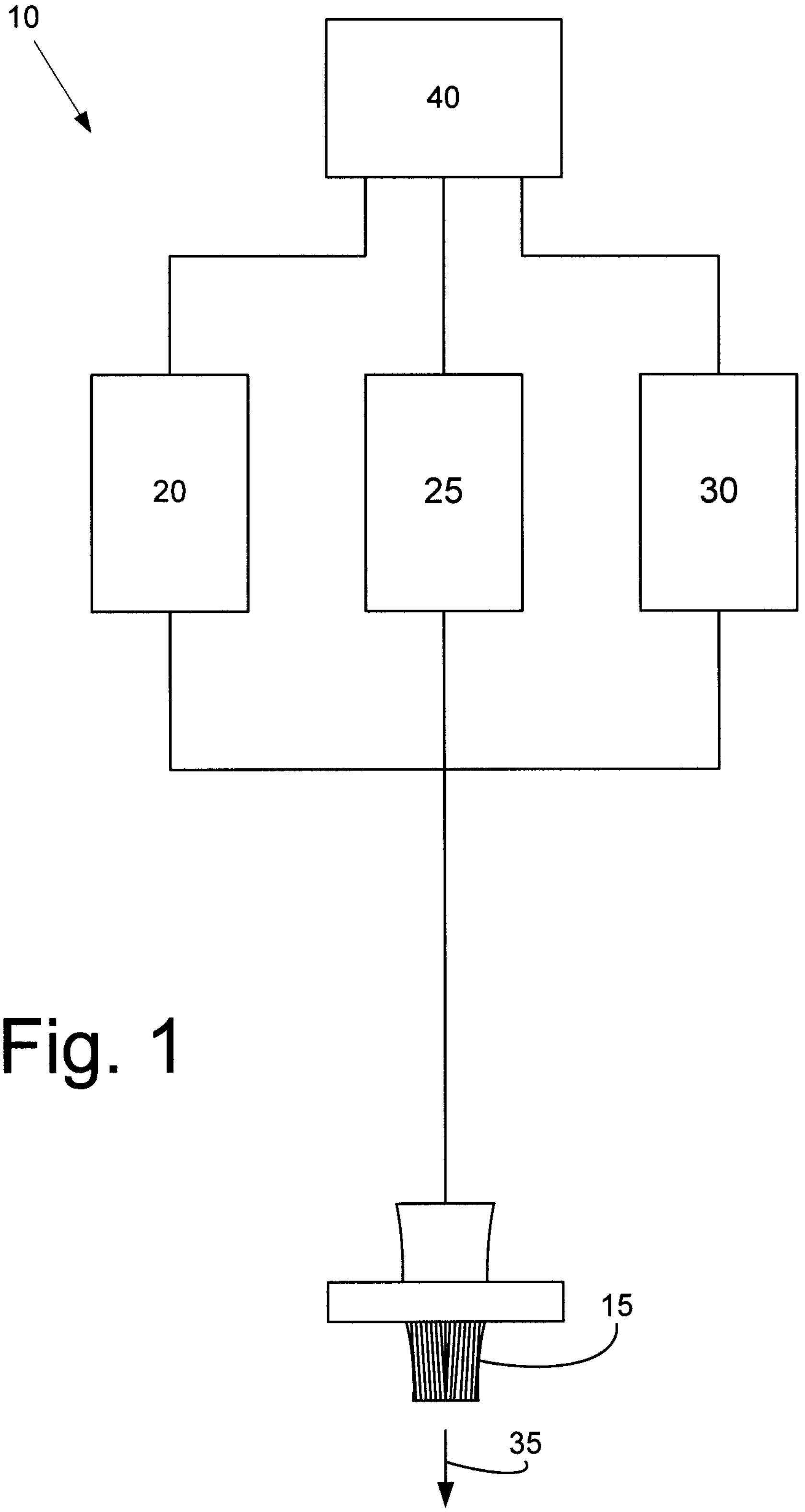
FIG. 1 is a schematic diagram of a beverage dispenser using micro-ingredients.
Figure 2:
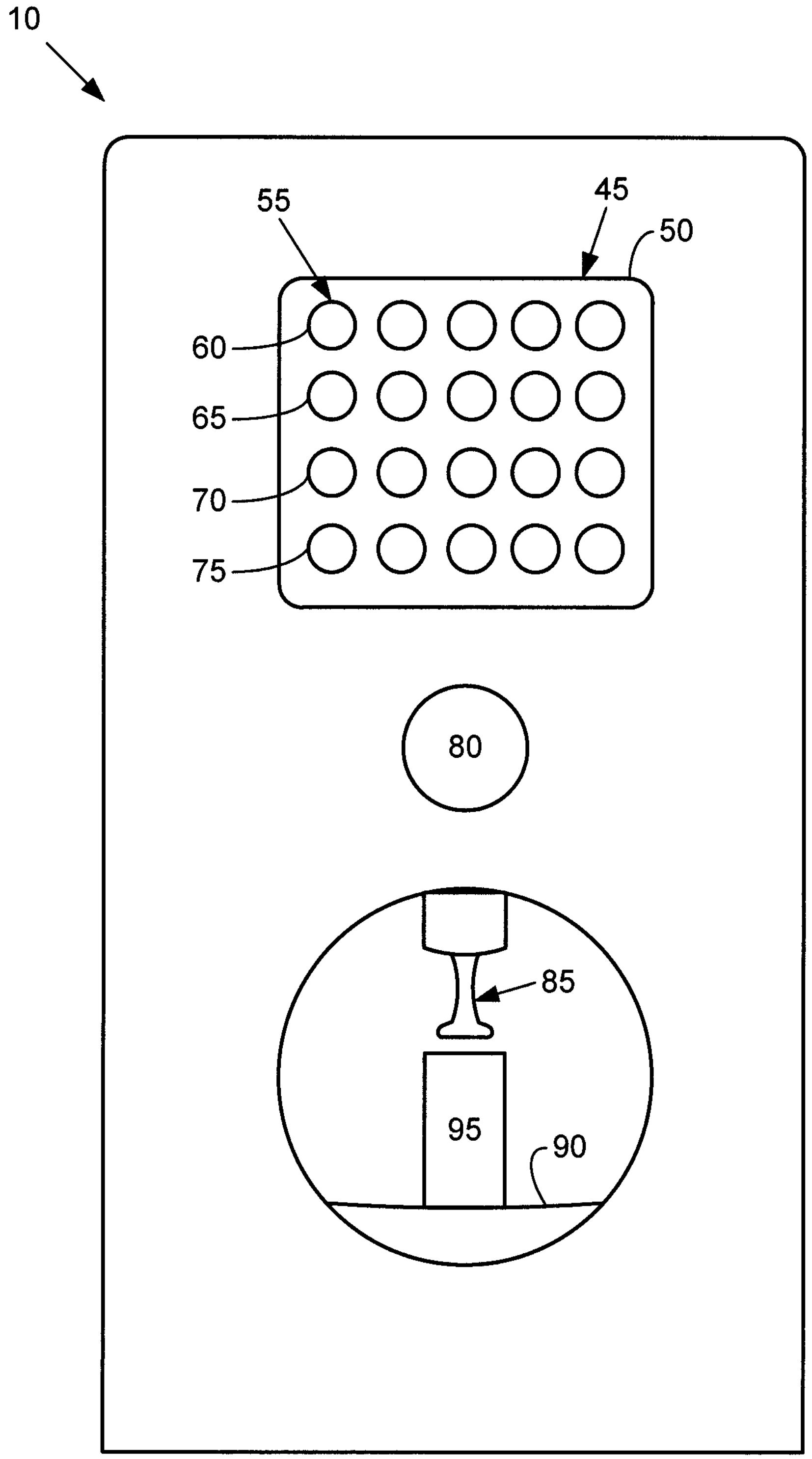
FIG. 2 is a plan view of a beverage dispenser with a graphical user interface.

Referring now to the drawings, in which like numerals refer to like elements throughout the several views, FIGS. 1 and 2 show a beverage dispenser 10. The beverage dispenser 10 may be a beverage dispenser such as that described in commonly owned U.S. Pat. No. 7,757,896 described above and incorporated herein. Generally described, the beverage dispenser 10 may include a dispensing nozzle 15 for combining a number of micro-ingredients 20, a number of macro-ingredients 25, a diluent 30, and/or other ingredients to create a beverage 35. The micro-ingredients 20 generally have reconstitution ratios of about ten to one (10:1) and higher, twenty to one (20:1) and higher, fifty to one (50:1) and higher, and/or one hundred to one (100:1) and higher. Examples of the micro-ingredients 20 include natural and artificial flavors, flavor additives, natural and artificial colors, artificial sweeteners, additives for controlling tartness, functional additives, and the like. The macro-ingredients 25 generally have reconstitution rations in the range of about three to one (3:1) to about six to one (6:1). The macro-ingredients may include sugar, syrup, high fructose corn syrup, juice concentrates, and the like. The diluent 30 may be water, carbonated water, and other types of fluids. Other types of ingredients also may be used herein.

The micro-ingredients 20, the macro-ingredients 25, and the diluents 30 may be mixed at the dispensing nozzle 15 or elsewhere. Examples of suitable dispensing nozzles 15 include those described in commonly owned U.S. Pat. No. 7,866,509 B2 to Ziesel, entitled, "DISPENSING NOZZLE ASSEMBLY" and commonly owned U.S. Pat. No. 7,578, 415 B2 to Ziesel, et al., entitled, 'DISPENSING NOZZLE ASSEMBLY." U.S. Pat. Nos. 7,866,509 B2 and 7,578,415 B2 are incorporated herein by reference in full. Multiple dispensing nozzles 15 may be used herein. Conventional dispensing nozzles with conventional beverage ingredients also may be used herein.

Dispensing the beverage 35 from the dispensing nozzle 15 may be controlled by a control device 40. The control device 40 may be a conventional microcomputer and the like capable of executing programmable commands. The control device 40 may be internal or external from the beverage dispenser 10. The functionality of the control device 40 may be implemented in software, firmware, hardware, or any combination thereof. One control device 40 may control multiple beverage dispensers 10 and/or one beverage dispenser 10 may have multiple control devices 40 with specific tasks.

The beverage dispenser 10 may include a graphical user interface 45 for communicating with a consumer, a crew member or other user. In this example, the graphical user interface 45 may include a touch screen 50 although other types of interfaces may be used herein. The touch screen 50 may include a number of icons 55. Any number of the icons 55 may be used herein. Each of the icons 55 may represent a different beverage 35 or other type of product. For example, a first set of icons 60 may represent carbonated soft drinks such as a Coca-Cola® brand beverage offered by or under license to The Coca-Cola Company of Atlanta, Georgia Other types of carbonated soft drink offerings may include a Diet Coke® beverage, a Sprite® beverage, a Fanta® beverage, and the like. A second set of icons 65 may represent juices and juice containing beverages such as a Hi-C® beverage, a Minute Maid® beverage, and the like. A third set of icons 70 may include water beverages including a Dasani® beverage and the like. A fourth set of icons 75 may represent flavored beverages such as a Fanta® Fruit Punch beverage, a Fanta® Lime beverage, and the like. Any number of icons 55 representing any number of beverages 35 or other products may be used herein. The number of beverages 35, flavors, and combinations thereof that may be offered by the beverage dispenser 10 may be substantially unlimited.

The beverage dispenser 10 may include a pour button 80. The pour button 80 may be a separate element apart from the touch screen 50 or the pour button 80 may be an icon 55 on the touch screen 50. The beverage dispenser 10 also may include an ice dispensing system 85 positioned about a dispensing area 90. Other components such as portion size buttons and the like also may be used herein. The beverage dispenser 10 described herein is for purpose of example only. Many other types of dispensing device may be used.

In use, a consumer, a crew member, or other user may select a beverage 35 or other product from the icons 55 on the touch screen 50. The user may fill his/her cup 95 via the ice dispensing system 85 in the dispensing area 90 and then presses the pour button 80. The user releases the pour button 80 once his or her cup 95 is filled with the desired beverage or beverages. Alternatively, portion control buttons also may be used such that the beverage dispenser 10 automatically fills the cup 95 with the correct volume of the beverage 35. The beverage dispenser 10 described above is for the purpose of example only. Many other types of beverage dispensers with many different components and configurations may be used herein.

Figure 3:
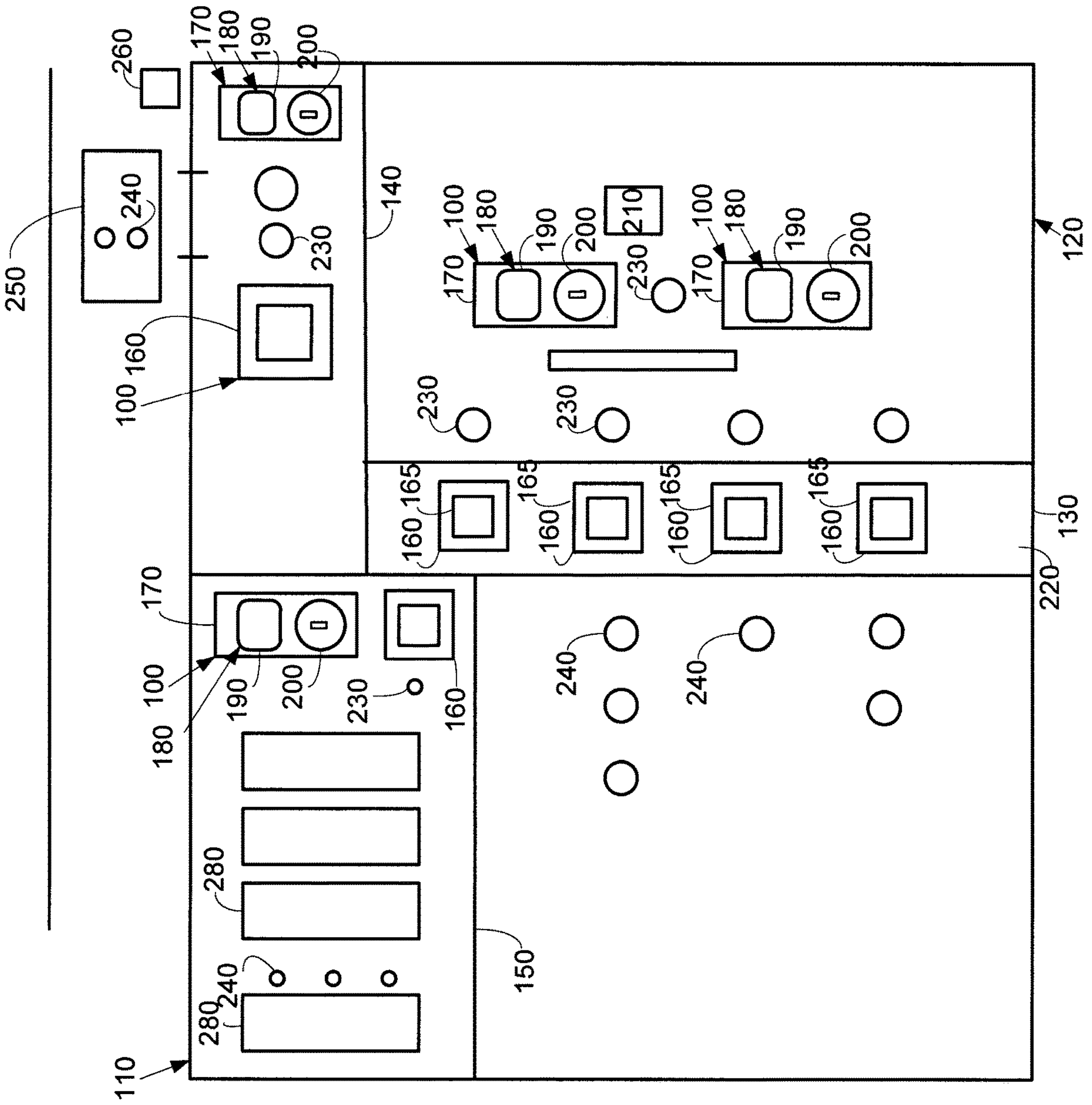
FIG. 3 is a schematic diagram of a restaurant with a number of remote beverage dispensing systems as may be described herein.

FIG. 3 shows several examples of a remote beverage dispensing system 100 as may be described herein. In this example, the remote beverage dispensing systems 100 may be installed in a restaurant 110 or other type of retail outlet. For example, the restaurant 110 may be a full service restaurant, a quick service restaurant, a drive through, and the like. The restaurant 110 may have a number of different customer zones 120. The customer zones 120 may include a counter service service zone 130, a drive through zone 140, a table service zone 150, and the like. Other types of customer zones 120 and combinations thereof also may be used herein. Although the remote beverage dispensing systems 100 are shown as being operated by crew members, customers or other users also may have access thereto at least in part in a self-serve zone and the like.

One or more of the customer zones 120 in the restaurant 110 may include one of the remote beverage dispensing systems 100 or components thereof. Each remote beverage dispensing system 100 may include one or more point-of-sale devices 160. The point-of-sale devices 160 may include one or more input devices 165. The input devices 165 may be any type of user interface, such as conventional cash registers, order monitoring systems (bump screens), touch screens, and similar types of user input devices typically found in restaurants and other types of retail outlets. Different types of point-of-sale devices 160 may be used in different customer zones 120 of the restaurant 110.

The remote beverage dispensing system 100 also includes one or more remote beverage dispensers 170. The remote beverage dispensers 170 may be similar to the beverage dispensers 10 described above although other types of beverage dispensers may be used herein. The remote beverage dispensers 170 may include a graphical user interface 180 such as a touch screen 190 or other type of input device and a dispensing area 200 to dispense a beverage 35 into a cup 95 and the like. Each remote beverage dispenser 170 also may include a control device 210 such as that described above. Alternatively, a number of remote beverage dispensers 170 may be in communication with a single control device 210 in a network. The remote beverage dispensers 170 may use the micro-ingredients 20 so as to provide a large variety of beverages 35 herein in a relatively small footprint.

Likewise, the point-of-sale devices 160 may be in communication with the remote beverage dispensers 170 and/or the control 210. The electronic communication may be wired or wireless. The remote beverage dispensers 170 may be remote in distance from the point-of-sale devices 160. Any position and any distance may be used herein. The remote beverage dispensers 170 and the point-of-sale devices 160 may or may not be in line of sight of each other, may or may not be in the same room, and/or may or may not be in the same customer zone 120. Other components and other configurations may be used herein.

In the counter service zone 130, a number of the point-of-sale devices 160 may be positioned about a counter 220 and the like. Any number of the point-of-sale devices 160 may be used herein. The point-of-sale devices 160 may be operated by a crew member 230. The crew member 230 may take orders from a number of customers 240. The same or a different crew member 230 then may fill the order via one or more remote beverage dispensers 170. Any number of the remote beverage dispensers 170 may be used. A crew member 230 then may provide the beverages 35 and other items in the order to the customer 240.

In the drive through service zone 140, a crew member 130 may receive an order from a customer 240 in his or her automobile 250 via a menu board 260 and the like. The crew member 230 may enter the order via a point-of-sale device 160. Any number of the point-of-sale devices 160 may be used herein. The same or a different crew member 230 then may fill the order via one or more remote beverage dispensers 170. Any number of the remote beverage dispensers 170 may be use. A crew member 230 then may provide the beverages 35 and other items in the order to the customer 240 in his or her automobile 250.

In the table service zone 150, any number of customers 240 may be seated at a number of tables 280 or elsewhere. A crew member 230 may take the order of each customer 240 at each of the tables 280. The crew member 230 then may enter the orders at a point-of-sale device 160. Any number of point-of-sale devices 160 may be used. The same or a different crew member 230 then may fill the order via one or more remote beverage dispensers 170. Any number of the remote beverage dispensers 170 may be use. A crew member 230 then may provide the beverages 35 and other items in the order to the customers 240 at the tables 280.

Entry of certain types of information fields 290 may be mandatory before a beverage 35 may be dispensed. For example, the number or other identifier of a given table 280 may be required so as to ensure that the crew member 230 enters the appropriate information before dispensing the beverage 35. The beverage information may be linked to an overall restaurant ordering system such that the crew member 230 does not need to enter information multiple times such as once to enter the beverage orders and a second time to enter the food orders. This requirement ensures that the crew member 230 will not forget about the beverage order when later entering food orders and the like.

Figure 4:
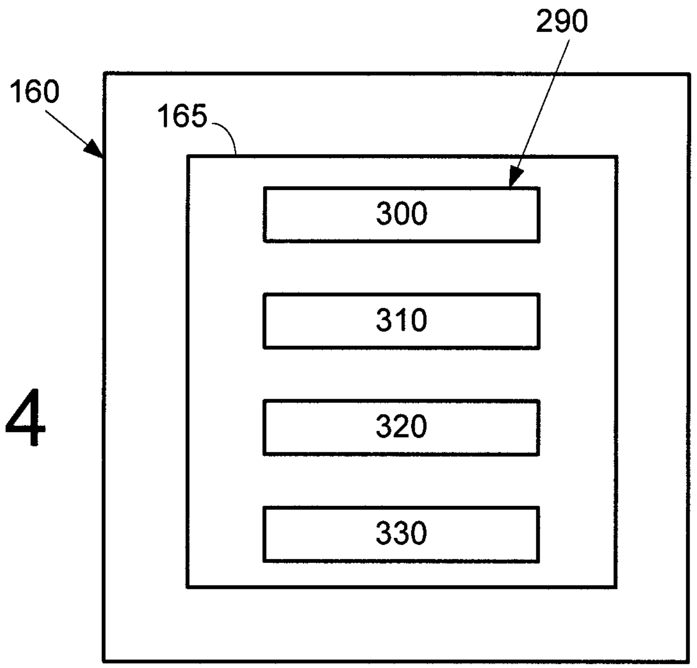
FIG. 4 is a schematic diagram of an input screen on a point-of-sale device as may be used with the remote beverage dispensing system.

FIG. 4 shows an example of the input device 165 for use with the point-of-sale devices 160. The input device 165 may include a number of information fields 290. In this example, the information fields 290 may include an identification field 300. The identification field 290 may identify the customers 240 by a customer number, a table number, an automobile number, and the like. The information fields 290 also may include one or more product fields 310. The product fields 310 may include the type of beverage 35 or other product ordered. The information fields 290 also may include a proportion field 320. The proportion field 320 may identify the beverage 35 or the product as small, medium, large, etc. The information fields 290 also may include an other information field 330. The other information field 330 may relate to any other attribute of the costumer or product such as "no ice", "heavy ice", and the like. Any number of other types of information fields 290 may be used herein.

Figure 5:
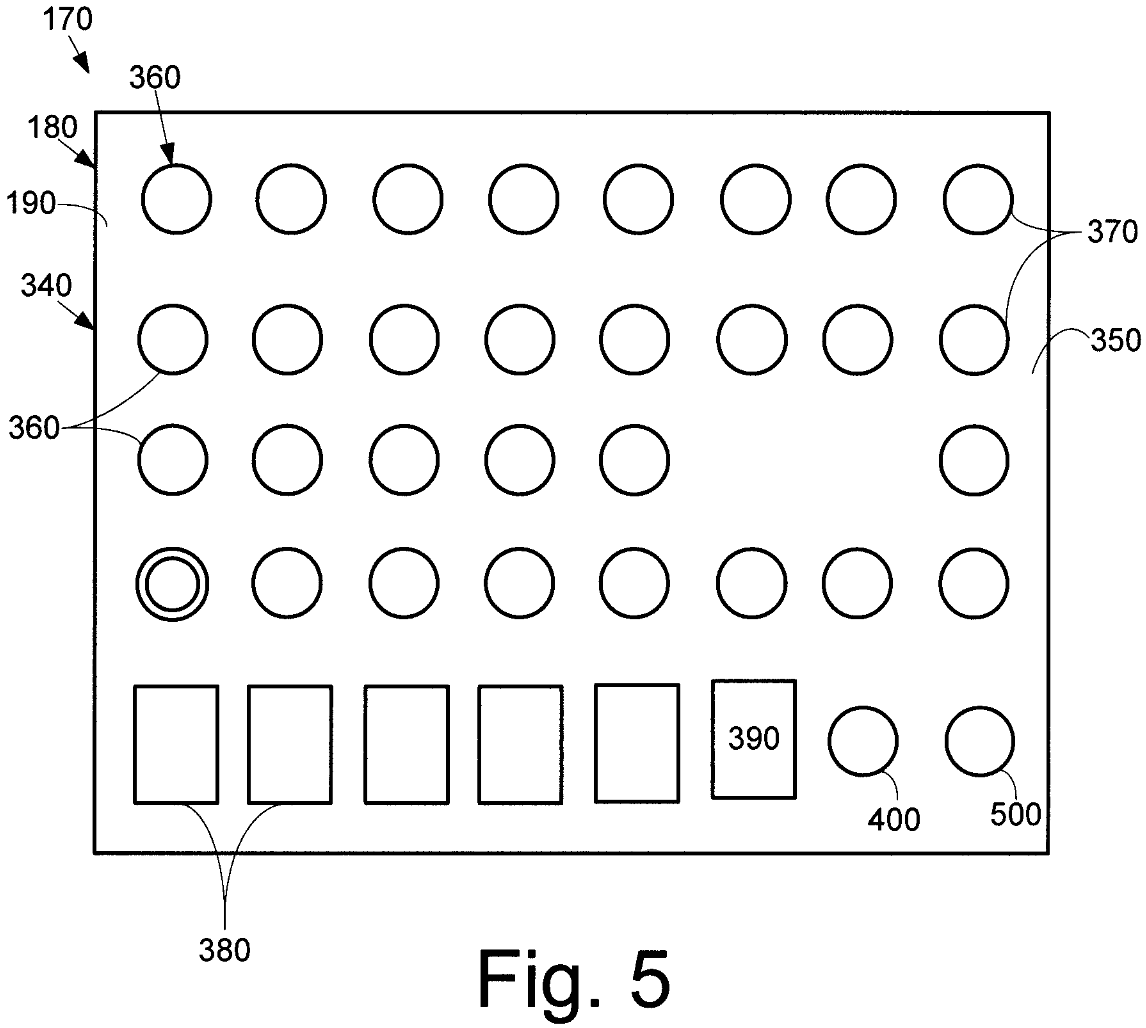
FIG. 5 is a schematic diagram of a manual brand selection screen as may be used with the remote beverage dispensing system.

FIG. 5 shows an example of the touch screen 190 of the graphical user interface 180 of the remote beverage dispenser 170. Similar to the touch screen 50 described above, the touch screen 190 may include a number of screens 340 including a manual input screen 350. The manual input screen 350 may have a number of icons 360 thereon. The icons 360 may include any number of beverage icons 370. The beverage icons 370 may relate to any type and/or flavor of a beverage 35. The manual input screen 350 also may include a number of proportion icons 380. The proportion icons 380 relate to the size of the beverage 35 to be dispensed in an automatic fashion. The icons 360 also may include a pour icon 390. The pour icon 390 may instruct the remote beverage dispenser 170 to pour a beverage 35 while the icon 390 is being pushed. Alternatively, the pour icon 390 may be positioned as a separate button elsewhere on the remote beverage dispenser 170 in a manner similar to that described above.

A crew member 230 thus may select a beverage 35 according to the beverage icons 370 and may either select the size of the beverage 35 according to the proportion icons 380 for automated pouring or may press the pour icon 390 for manual pouring. If the proportion icons 380 are selected, the remote beverage dispenser 170 will pour a predetermined volume of the beverage 35 into the cup 95. The remote beverage dispenser 170 may assume that the cup 95 includes a predetermined amount of ice. The remote beverage dispenser 170 may pause during the dispense so as to accommodate foaming with certain types of beverages. If the pour icon 390 selected, the remote beverage dispenser 170 will dispense until the icon 390 may be released. Other components and other configurations may be used herein.

Figure 6:
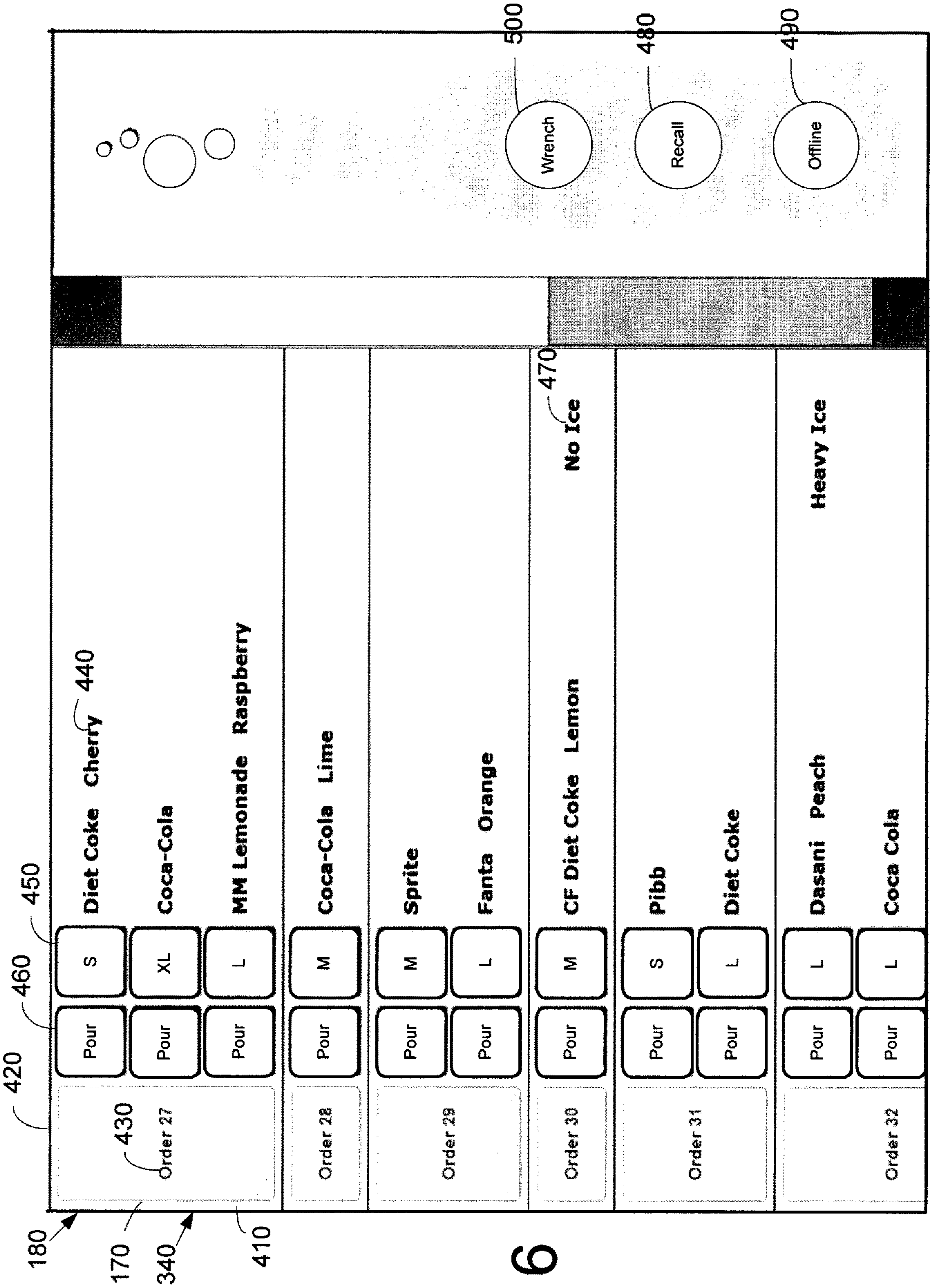
FIG. 6 is a schematic diagram of a point-of-sale order queue screen as may be used with the remote beverage dispensing system.

The manual selection screen 350 also may include a point-of-sale order queue icon 400. Touching the point-of-sale order queue icon 400 may change the screen 190 to a point-of-sale order queue screen 410 such as that shown in FIG. 6. The point-of-sale order screen 410 may be divided into a number of orders 420 as entered by the point-of-sale devices 160. The orders 420 may be identified by an order identifier 430 or other type of identifier. The order identifier 430 also may include information associated with the origin of the order 420 as entered into field 300 of input device 165. Such information associated with the origin of the order 420 might include customer number, table number, or automobile number.

Each order 420 may include one or more beverage selections 440. Each beverage selection 440 may have an automated pour icon 450 and a manual pour icon 460. The automatic pour icon 450 may show the selected size of the beverage 35. The manual pour icon 460 may simply state "POUR" and the like. Pressing the automated pour icon 450 causes the remote beverage dispenser 170 to dispense automatically the appropriate volume of the beverage. Pressing the manual pour icon 460 causes the remote beverage dispenser 170 to dispense the desired beverage 35 while the icon is being touched. The beverage selection 440 may be highlighted while the manual icon 460 is being touched so as to alert the crew member 230 to watch the fill level in the cup 95. Each order 420 also may include other types of information fields 470 such as "no ice", "heavy ice," "customer identification," and the like.

Once the remote beverage dispenser 170 dispenses the beverage 35, the particular beverage selection 440 may be grayed out or otherwise indicated as being fulfilled. The beverage selections 440 may be filled in any order. Once a complete order 420 has been completed, the order number 430 may be highlighted or otherwise indicated as being completed. The order number 430 also may be removed from the screen by touching the order number 430, by the elapse of a predetermined time, or by any other parameter.

Figure 7:
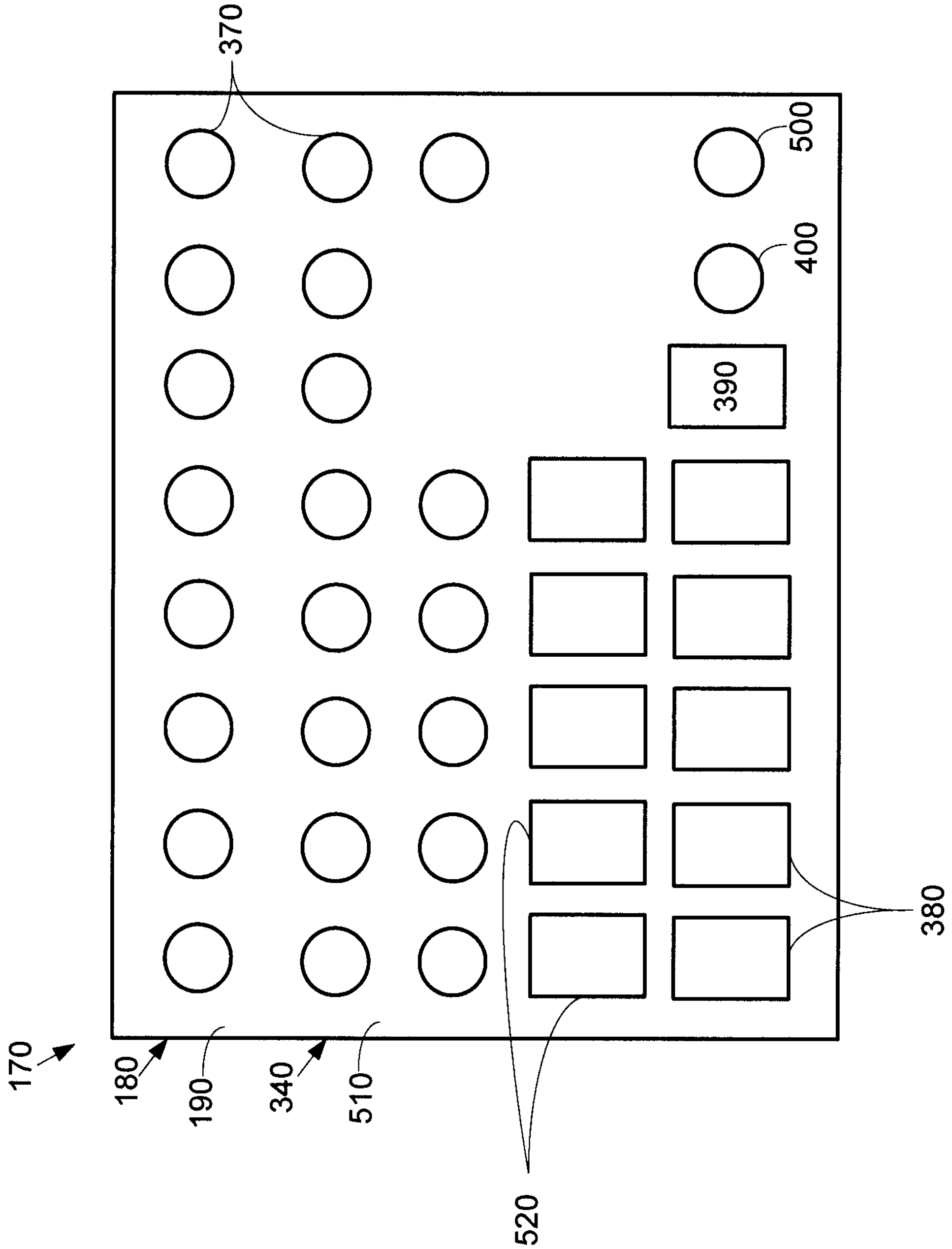
FIG. 7 is a maintenance screen as may be used with the remote beverage dispensing system.

The point-of-sale order queue screen 410 may include other types of icons 360. For example, a recall icon 480 may be used to recall an order number 430 if, for example, a particular beverage 35 is dropped or otherwise not presentable to a customer. Likewise, an offline icon 490 may be used. Touching the offline icon 490 may take the screen 190 back to the manual screen 350. Any or all of the screens 340 also may include a service icon 500 as is shown in FIG. 7. Touching the service icon 400 may take the crew member 230 to a service screen 510. The service screen 510 may include a number of operational icons 520. The operational icons 520 may relate to maintenance, current levels of the micro-ingredients 20, the macro-ingredients 25, and the like. Other types of information may be displayed herein. Other components and other configurations may be used herein.

Figure 8:
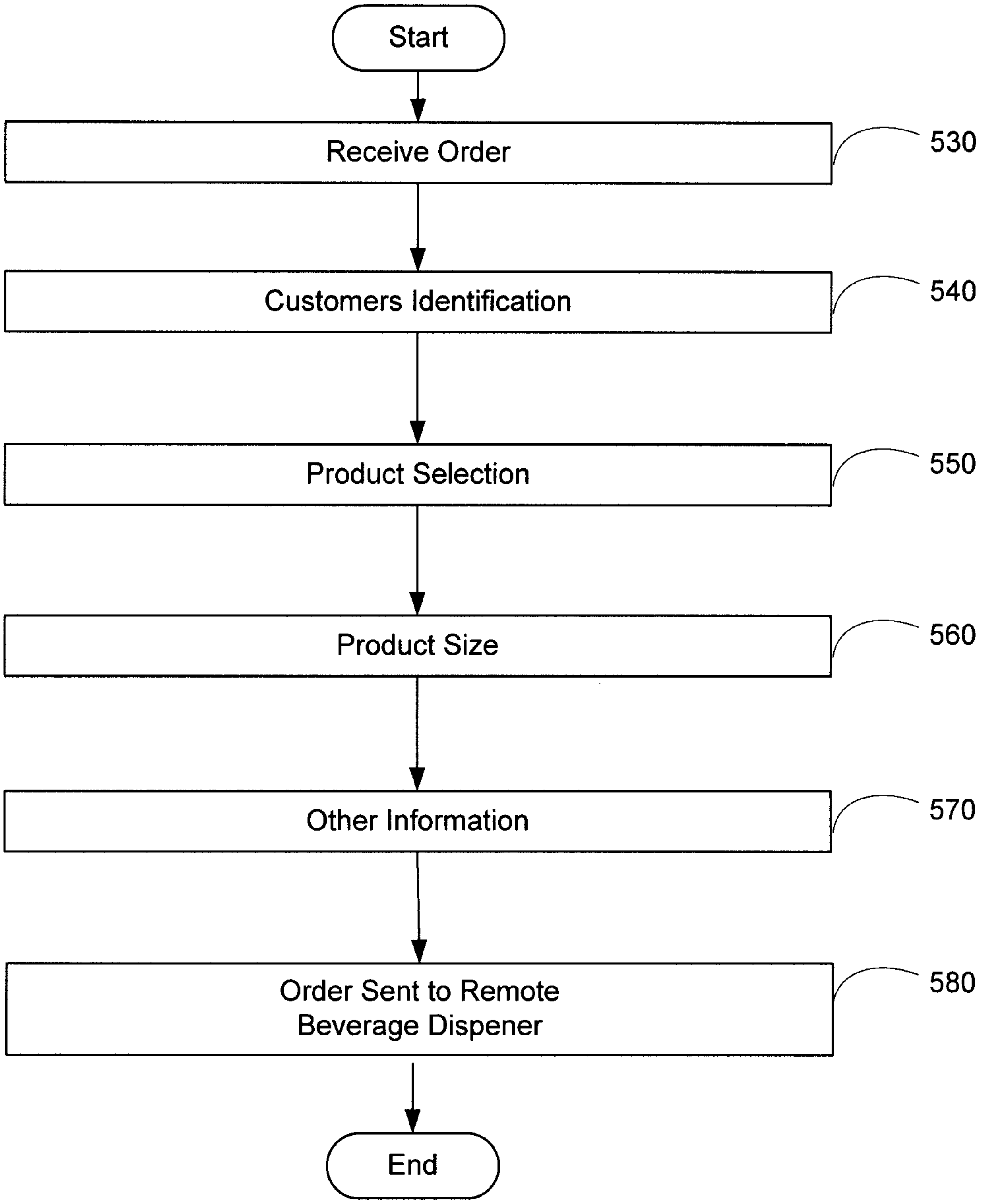
FIG. 8 is a flowchart showing exemplary steps in a method of ordering beverages on a point-of sale device as may be described herein.

FIG. 8 shows a flow chart of an example of the use of the point-of-sale devices 160 of the remote beverage dispensing system 100. At step 530, the crew member 230 receives an order for a beverage or other type of product from a customer 240. At step 540, the crew member 230 identifies the customer 240 via the identification field 300. The identification may be a customer number automatically generated by the point-of-sale device 160, a point-of-sale device number related to the point-of-sale device 160, a table number related to the table 280, an automobile number related to the automobile 250, or any type of identifier. These identifiers may be generated by the point-of-sale device 160 or entered by the crew member 230. The crew member 230 then enters the type of product in the product field 310 at step 550, enters the product size in the proportion field 320 at step 560, and enters any other information in the other field 330 at step 570. Other types of information also may be entered herein. At step 580, the point-of-sale device 160 sends the order 420 with one or more beverage selections 440 to one or more of the remote beverage dispensers 170. Each order 420 may have any number of beverage selections 440.

Figure 9:
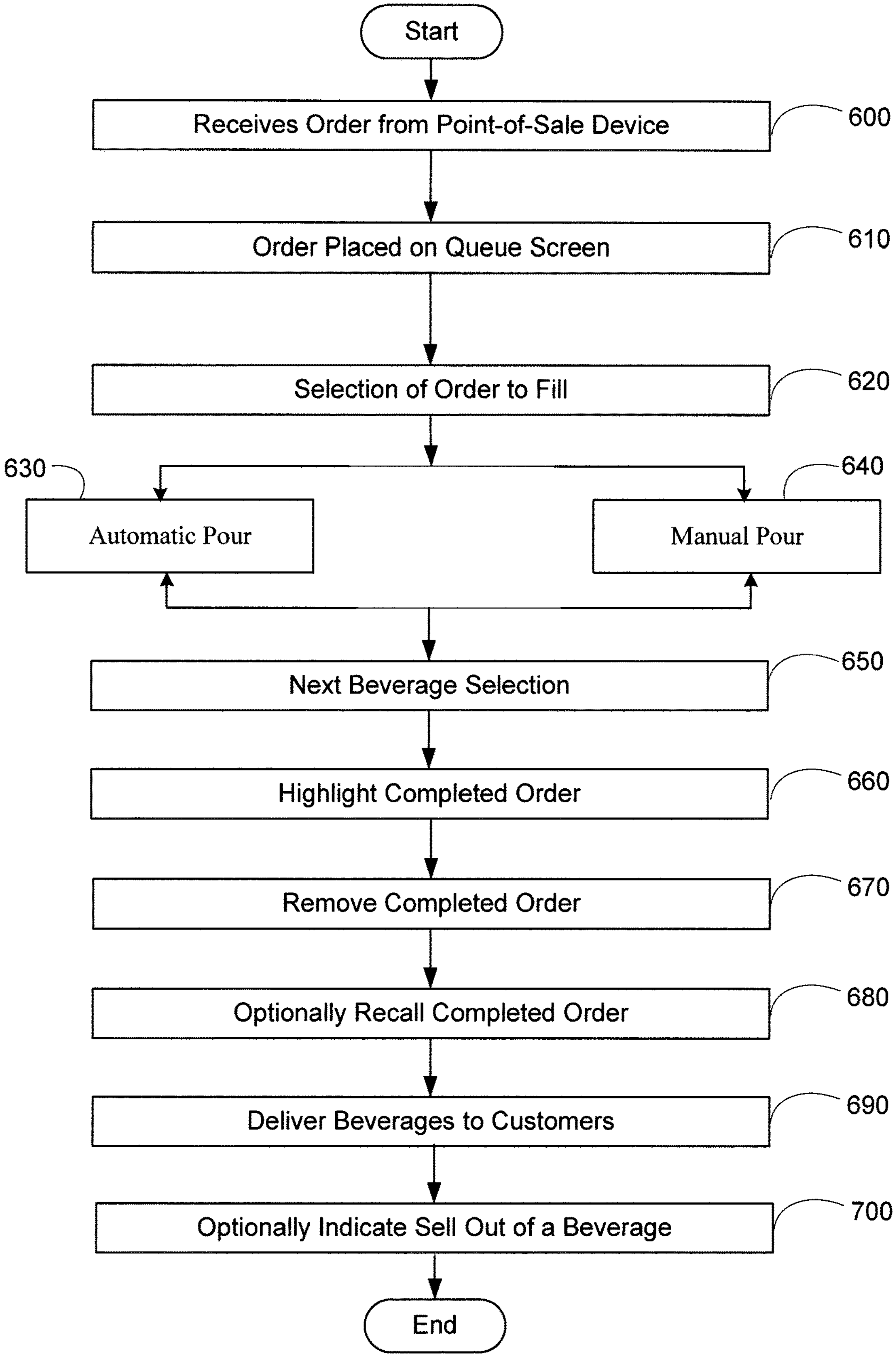
FIG. 9 is a flow chart showing exemplary steps in a method of dispensing beverages via a point-of-sale order queue screen as may be described herein.

FIG. 9 shows an example of the operation of the remote beverage dispenser 170 on the point-of-sale order queue screen 410. At step 600, the remote beverage dispenser 170 may receive the order 420 from the point-of-sale device 160. At step 610, the remote beverage dispenser 170 places the order 420 on the point-of-sale order queue screen 410 and assigns an order number 430 to the order 420. At step 620, the crew member 230 selects which order number 430 or beverage selection 440 to fill. In this example, the crew member 240 may select "Sprite" in "ORDER 29" as the first beverage selection. At step 630, the crew member 230 may touch the automatic pour icon 450 such that the remote beverage dispenser 170 dispenses the appropriate volume of the selected beverage. Alternatively at step 640, the crew member 230 may select the manual pour icon 460. The remote beverage dispenser 170 thus will dispense the beverage 35 while the manual pour icon 460 is being touched. The product selection 440 may be highlighted during the dispense of the beverage 35.

In either case, the beverage selection 440 then may be grayed out or otherwise indicated as being filled. The crew member 230 then may select the next beverage selection 440 at step 650 in a similar manner. The next beverage selection 440 might come from "ORDER 29" or from another order 430. Several orders 430 may remain partially filled on the beverage queue screen 410. Once each beverage selection 440 in ORDER 29 is complete, the order number 430 may be highlighted at step 660 or otherwise indicate that the order has been filled. At step 670, ORDER 29 may disappear from the screen 350. At step 680, the recall icon 480 may be optionally touched to recall the order number 430. At step 690, the beverages 35 may be delivered to the customers 240. At step 700, the remote beverage dispenser 170 may optionally inform the point-of-sale devices 160 that a particular beverage 35 or beverage flavor is sold out or exhausted such that the point-of-sale devices 160 will no longer accept an order for the given beverage 35. The remote beverage dispenser 170 also may inform the point-of-sale devices 160 that new beverage selections have been uploaded to the remote beverage dispenser 170 and are now available.

Figure 10:
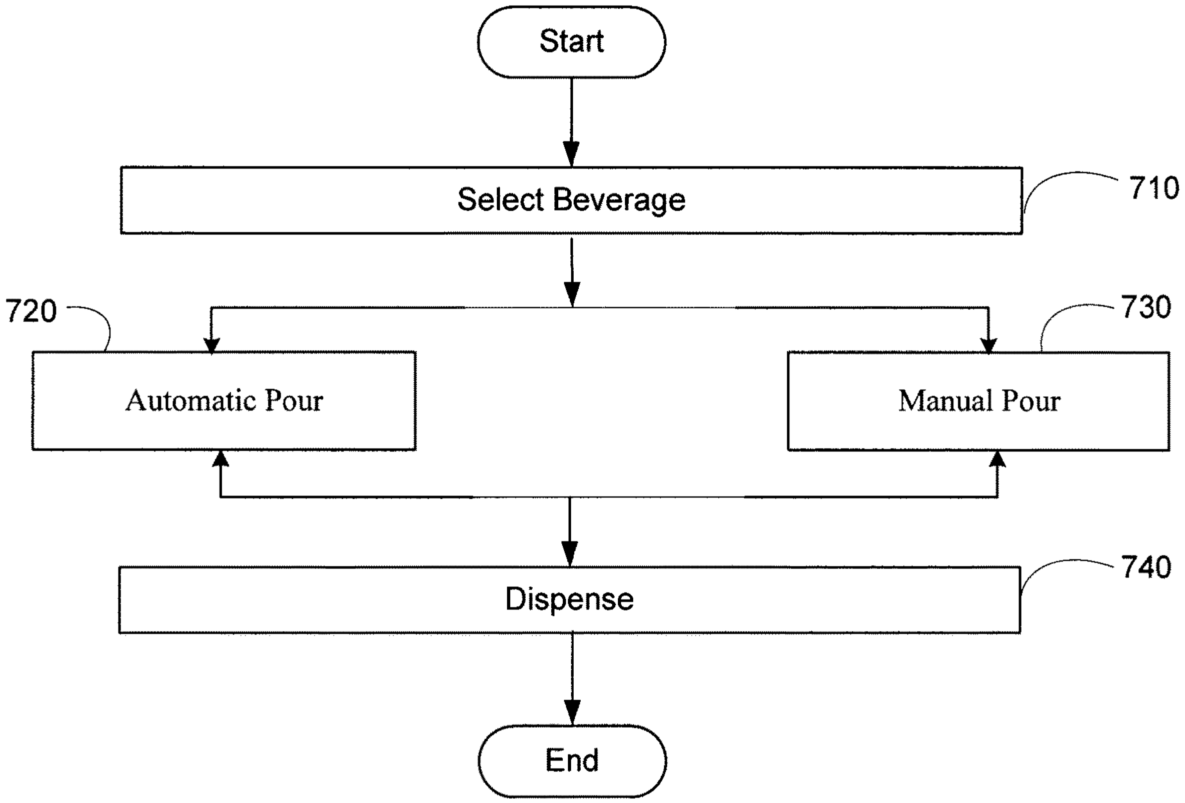
FIG. 10 is a flow chart showing exemplary steps in a method of dispensing beverages via a manual selection screen as may be described herein.

FIG. 10 shows the operation of the remote beverage dispenser 170 and the manual screen 350. At step 710, a crew member 230 may touch the appropriate beverage icon 370. At step 720, the crew member 230 may touch the appropriate proportion icon 380 so as to automatically dispense the beverage 35 or, at step 730, touch the "POUR" icon 390 to dispense manually. In either case, the remote beverage dispenser 170 dispenses the beverage at step 740. The crew member 230 may toggle back and forth between the screens 350, 410 as desired. Alternatively, both screens 350, 410 may be shown at the same time in a slit screen arrangement.

The methods described herein are for the purpose of example only. Specifically, the method steps described herein need not be performed in any particular order. Not all of the method steps need be performed and/or other method steps also may be added.

The remote beverage dispensing system 100 described herein thus links the point-of-sale devices 160 with the remote beverage dispensers 170 so as to provide the crew members 230 with flexibility in filling orders 420 in many different customer zones 120 in a restaurant 110 and the like. Crew members 230 may fill orders either in the manual screen 350 or from the point-of-sale device 160 in the point-of-sale order queue screen 410. The queue screen 410 may group orders 420, show poured beverages 35, and show fulfilled orders 420. The beverages 35 may be poured in any order. Moreover, the remote beverage dispensing system 100 provides two way communications such that the point-of-sale devices 160 may indicate when the remote beverage dispensers 170 are sold out.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A remote beverage dispensing system for filling a number of orders with a plurality of separate, discrete beverage selections in each of the number of orders by a crew member, comprising:

a point-of-sale device for receiving the number of orders; and a beverage dispenser remote from the point-of-sale device for filling the number of orders;

the beverage dispenser comprising an interface with a point-of-sale order queue screen in communication with the point-of-sale device;

the point-of-sale order queue screen comprising the plurality of separate, discrete beverages selections separately grouped together in each of the number of orders;

the point-of-sale order queue screen indicates when the plurality of separate, discrete beverage selections in each of the number of orders is filled; and wherein the point-of-sale order queue screen displays the number of orders by an order identifier with each order identifier grouping the plurality of separate, discrete beverage selections in each of the number of orders; and the beverage dispenser comprising a manual selection screen.

2. The remote beverage dispensing system of claim 1, wherein the point-of-sale device comprises a plurality of information fields.

3. The remote beverage dispensing system of claim 2, wherein the plurality of information fields comprises an identification field, a product field, and/or a proportion field.

4. The remote beverage dispensing system of claim 1, wherein the interface comprises the manual selection screen thereon.

5. The remote beverage dispensing system of claim 1, wherein the interface comprises a service screen.

6. The remote beverage dispensing system of claim 1, wherein the manual selection screen comprises a plurality of beverage icons and a plurality of proportion icons.

7. The remote beverage dispensing system of claim 1, wherein the plurality of separate, discrete beverage selections on the point-of-sale queue screen comprises a manual pour icon and an automatic pour icon.

8. The remote beverage dispensing system of claim 1, wherein the point-of-sale order queue screen comprises a recall icon.

9. The remote beverage dispensing system of claim 1, further comprising a plurality of point-of-sale devices positioned in a plurality of customer zones.

10. The remote beverage dispensing system of claim 1, further comprising a plurality of beverage dispensers.

11. The remote beverage dispensing system of claim 1, wherein the remote beverage dispenser comprises a plurality of micro-ingredients therein.

12. The remote beverage dispensing system of claim 11, wherein the plurality of micro-ingredients comprises reconstitution ratios of ten to one or higher.

13. The remote beverage dispensing system of claim 11, wherein the remote beverage dispensing system comprises one or more macro-ingredients therein.

14. The remote beverage dispensing system of claim 13, wherein the macro-ingredients comprise reconstitution ratios of about three to one to about six to one.

15. The remote beverage dispensing system of claim 1, wherein the remote beverage dispensing system comprises a plurality of carbonated soft drink components therein.

16. The remote beverage dispensing system of claim 1, wherein the number of orders comprises a food item therein.

17. The remote beverage dispensing system of claim 1, wherein the point-of-sale device and the beverage dispenser comprise two way communication therebetween.

18. The remote beverage dispensing system of claim 1, wherein the beverage dispenser comprises a pour button.

19. The remote beverage dispensing system of claim 18, wherein the pour button is separate from the manual selection screen.

20. The remote beverage dispensing system of claim 1, wherein the manual selection screen comprises a pour button.

21. The remote beverage dispensing system of claim 20, wherein the pour button comprises a manual pour button and/or an automatic pour button.

22. A remote beverage dispensing system for filling a number of orders with a plurality of separate, discrete beverage selections therein by a crew member, comprising:

a plurality of point-of-sale devices for receiving the orders; and one or more beverage dispensers remote from the plurality of point-of-sale devices for filling the orders;

the plurality of point-of-sale devices and the one or more beverage dispensers comprising two way communication therebetween such that the plurality of point-of-sale devices delivers the orders to be filled by the one or more beverage dispensers and the one or more beverage dispensers inform the plurality of point-of-sale devices of a status of available beverage selections and when the plurality of separate, discrete beverage selections grouped together in the orders are filled;

wherein the one or more beverage dispensers comprising an interface;

the interface comprising a point-of-sale order queue screen and a plurality of beverage icons; and the point-of-sale order queue screen comprising the beverages selections in each of the number of orders.

23. The remote beverage dispensing system of claim 22, wherein the status of available beverage selections indicates sold-out beverage selections.

* * * * *